Figure 1:
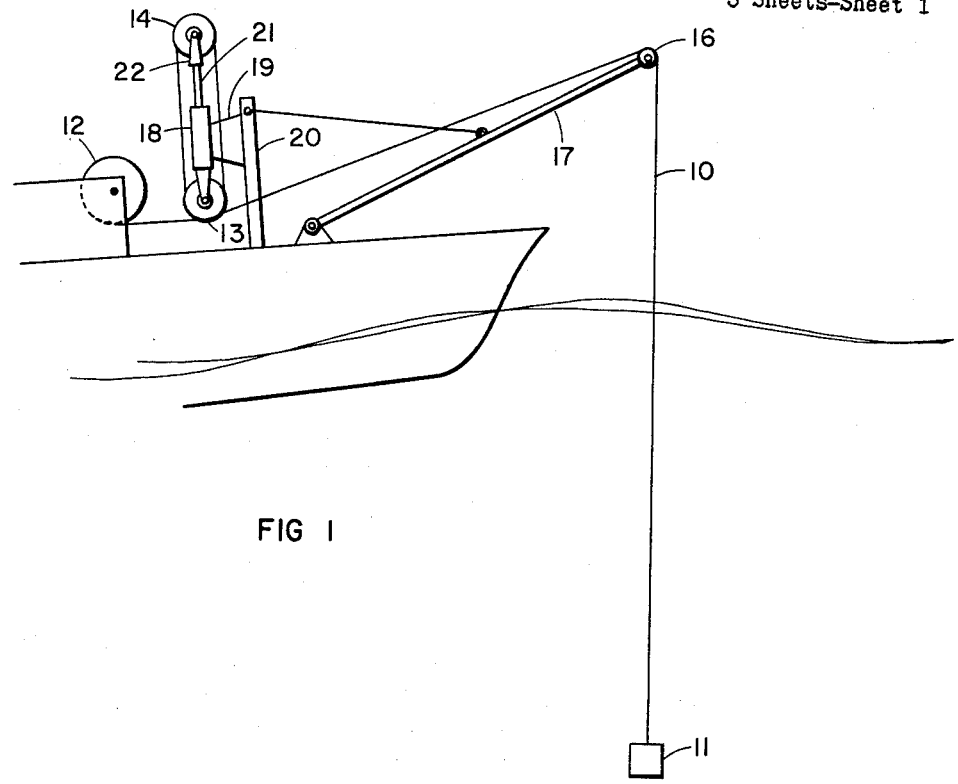

Sept. 29, 1964     R. A. NELSON     3,150,860
TENSION CONTROL DEVICE

Filed July 13, 1962     3 Sheets-Sheet 1

ROY A. NELSON
INVENTOR.

BY *J. C. Goldwire*
AGENT

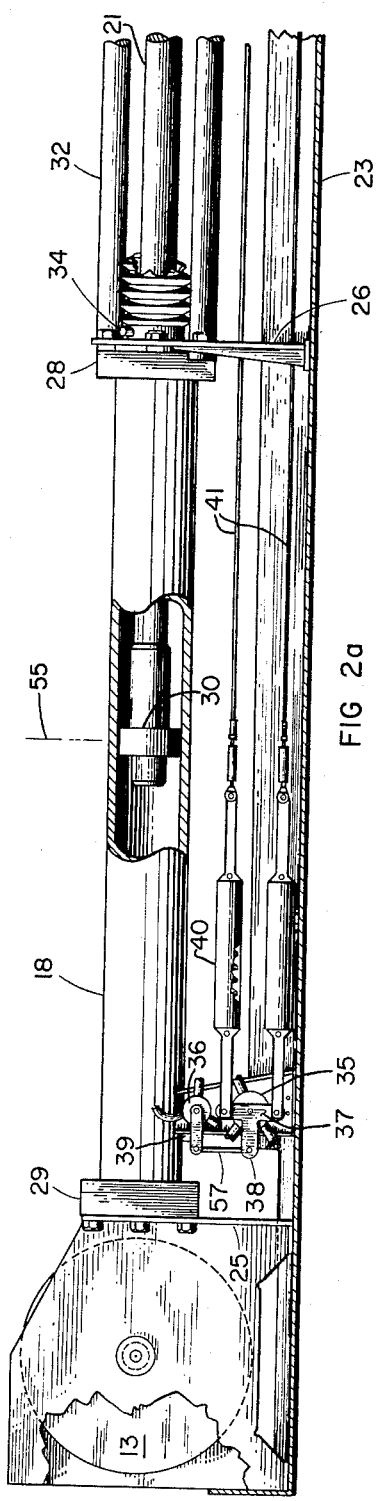
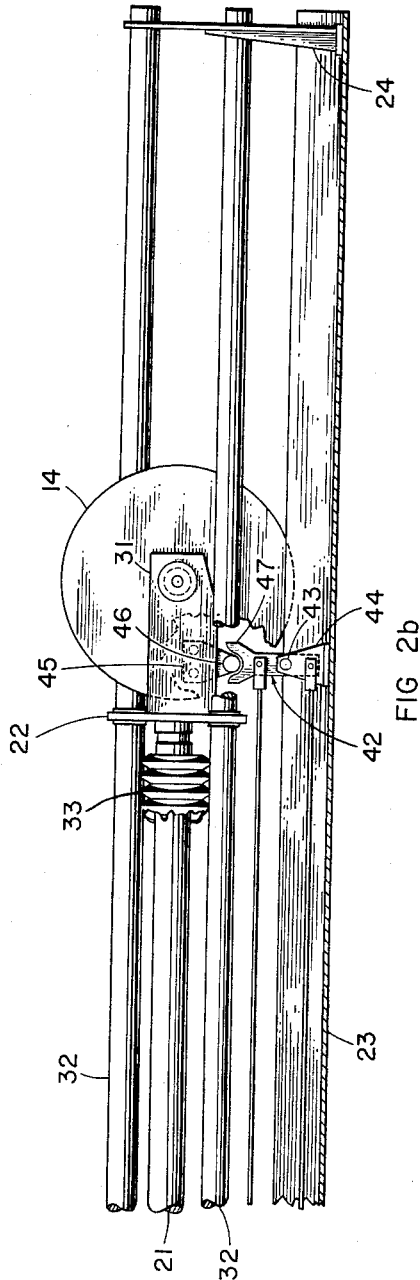

ROY A. NELSON
INVENTOR.

BY J.H.C. Goldwire
AGENT

United States Patent Office 3,150,860
Patented Sept. 29, 1964

3,150,860
TENSION CONTROL DEVICE
Roy A. Nelson, Arlington, Tex., assignor to Ling-Temco-Vought, Inc., Dallas, Tex., a corporation of Delaware
Filed July 13, 1962, Ser. No. 209,715
12 Claims. (Cl. 254—172)

This invention relates to means for preventing the transfer of oscillatory motion from an oscillating, supporting member to a supported body and more particularly to a device for controlling the tension in a cable or the like.

Many devices have in the past been provided to relieve over-tension in cables to the end that the cable will not be broken by a sudden overload. In essence, these devices consist of a hard spring actually or in effect connected into the cable and designed to yield to a force which is smaller, by a given margin, than the force required to break the cable. Such a device obviously is of no value in holding a load, suspended from an oscillating body, relatively motionless in air or water.

In attempts to stabilize loads suspended from oscillating bodies, constant-tension winches have been fashioned which sense the varying load in the cable and rotate the winch drum in one or the other direction as required to maintain a substantially even cable tension. The vertically directed force applied by the cable on the load having been made relatively even, the tendency of the load to oscillate upwardly and downwardly is much reduced. A reduction in oscillation is valubale to the operation of instrument packages, cameras, etc. and is critically needed in a body housing an underwater observer. Constant-tension winches, however, have left much to be desired. The drum upon which the cable is wound, together with the related mechanism including the drum-rotating motor, is of very considerable mass, and its great inertia must be overcome in accelerating, stopping, and reversing the drum; consequently, a heavy-duty motor and the expenditure of excessively great power are required. The electronic sensing means and the mechanical components of the device are complicated and thus tend to be unreliable, and their expense is great. Because of the high inertia of the system, actual close-tolerance control of cable tension is difficult to achieve.

It is, accordingly, a major object of the present invention to provide an improved device for maintaining a substantially constant tension in a cable or the like, which device is inexpensive and simple in construction.

A related object is to provide a device which effectively maintains an even tension in a cable, is reliable and rugged in operation, and is simply and inexpensively maintained.

Another object is to provide a cable tension control device which is of low weight and inertia and which requires only a relatively quite small power source.

Other objects and advantages will be apparent from the specification and claims and from the accompanying drawing illustrative of the invention.

Figure 3:
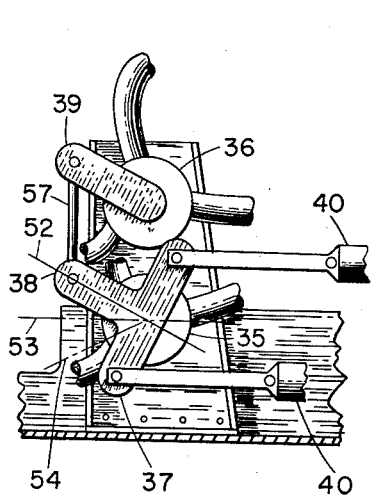
Figure 4:
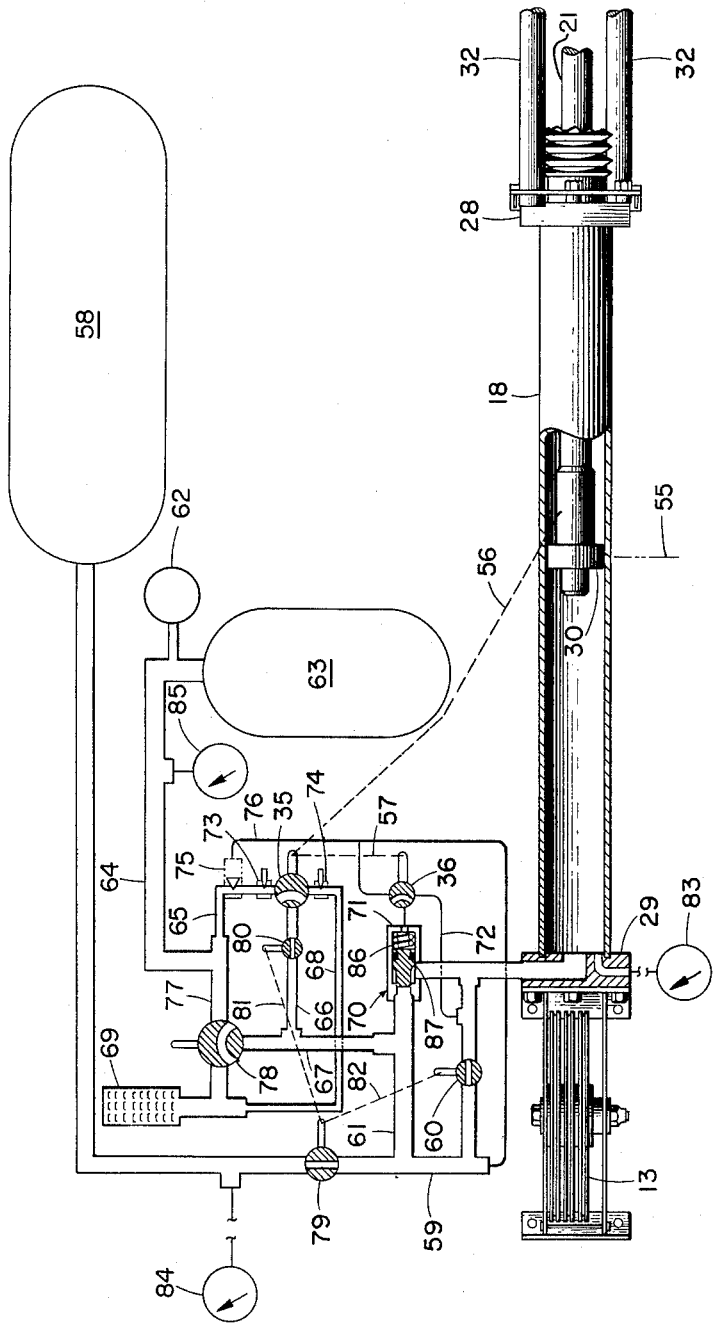

In the drawing,
FIGURE 1 is a diagrammatic view of the device as employed aboard a ship;
FIGURES 2a and 2b constitute a side elevational view of the device in partial longitudinal section;
FIGURE 3 is a partial view of the device showing the cam arm, roller, and two of the valves; and
FIGURE 4 is a front elevational view of a portion of the device and including a schematic representation of the pneumatic system, the cable having been omitted from FIGURES 3 and 4 for simplicity of illustration.

With reference now to FIGURE 1, an embodiment of the device is shown as employed aboard ship for suspending a load in the water. The cable 10 attached to the load 11 is wound at one end on a winch 12 and passes from the latter around the pulleys 13, 14 of the device, thence over a pulley 16 at the end of a boom 17 and downwardly into the water. Shown schematically, the device comprises a pneumatic actuator with a cylinder or barrel 17 rigidly mounted by suitable means 19 on fixed structure 20 of the ship, and the lower pulleys 13 are mounted in fixed location relative to the lower end of the cylinder. The upper pulleys 14 are movable since they are mounted by means of a crosshead 22 on the piston rod 21 extending from the cylinder upper end. The cable 10, crosshead 22, and sheaves 13, 14 will be understood to constitute means attaching the piston of the actuator to the load 11; and the force imposed by the latter varies as the ship rolls and rises and falls in the waves. As will be seen, the cylinder lower end is closed and is provided with fluid pressure through means (to be described) regulating its internal pressure to that which neutralizes the average force imposed on the piston rod 21 by the load 11; the piston of the actuator is thereby maintained in a desired neutral, mean position intermediate the ends of the cylinder 18, from which position it otherwise would be moved by the average force placed on the piston by the load. Means are provided for damping oscillation of the piston to each side of the desired neutral, mean position. The fluid suppliable to the actuator through the pressure regulating means is kept at a pressure bearing a constant ratio to the fluid pressure within the actuator, this being accomplished by means described in later paragraphs together with other details of the invention.

With reference to FIGURE 2, the cable tension control device comprises a channel member 23 on which are rigidly mounted upper, lower, and central support members 24, 25, 26. Spaced holes (not shown) through the channel member 23 and attached support members 24, 25, 26 provide for the mounting of the channel on fixed structure, for example, the mast of a ship.

The pneumatic actuator barrel or cylinder 18 is mounted at its upper and lower ends 28, 29 on the center and lower supports 26, 25, and the lower support 25 also mounts the bearings of a set of sheaves 13 whose axis of rotation preferably intersects and is perpendicular to the longitudinal axis of the cylinder. Closed at its lower end 29, the cylinder 18 has an open upper end 28 through which extends the rod 21 of a piston 30 slidably mounted in the cylinder. Rigidly mounted on the upper end of the rod 21 is a cross-head 22 bearing bifurcate arms 31 on which, in turn, are mounted a set of sheaves 14 aligned with the lower sheaves 13. To support the rod upper end against side-play, a pair of preferably tubular support members 32 are rigidly footed on the center support member 26 at the upper end of the cylinder and are interconnected and supported at their upper ends by the upper support member 24. The cross head 22 is provided with a pair of spaced openings through which slidably extend the tubular support members 32. It will here be noted that the cross-head 22 should be provided with low-friction bearings, as should all the sheaves 13, 14 and the boom sheaves 16 (FIGURE 1) to reduce friction in the system to a minimum. For the same reason, the piston 30 (FIGURE 2) should be provided with rings (not shown) of an extremely low-friction material such as a tetrafluorethylene, marketed under the name of "Teflon."

To prevent the entrance of foreign matter through the cylinder open, upper end 28, the piston rod 21 preferably is covered by an expandable, flexible boot 33 whose lower end is rigidly and sealingly attached to the cylinder upper end 28 and whose upper end is similarly attached on the rod 21 just below the crosshead 22. So that there will be no appreciable change of air pressure within the boot 33 upon reciprocation of the piston 30 in the cylinder 18, the effective cross-sectional area of the boot should equal the effective area of the piston 30. A suitable relief valve 34 communicating between the interior of the boot 33 and the atmosphere is provided for venting excess air which may slowly leak past the piston 30 into the boot.

Mounted on the cylinder lower end 29 is a pair of two-position valves 35, 36. The first of these, the pressure control valve 35, has a shaft on which an arm 37 is rockably mounted at its center. The arm 37 has a cross-member 38 whose end is linked by a rod 57 or the like to the end of an arm 39 projecting from the other or pilot valve 36. Clockwise rocking of the arm 37 therefore actuates both valves 34, 35 in one direction, while counterclockwise rocking of the arm actuates the valves in the opposite direction. To the ends of the arm 37 are attached, preferably through a pair of over-tension relief springs 40, a pair of cables 41 whose upper ends are attached to a cam arm 42 at points spaced on opposite sides of the pivotal mounting means 43 of the cam arm on a bracket 44 in turn rigidly mounted on the channel member 23 just above the position occupied by the crosshead 22 when the piston 30 is at the center of the cylinder 18. An arm 45, rigidly mounted on one of the bifurcate arms 31 bearing the upper sheaves 14, mounts a roller 46 which engages the neighboring, notched end 47 of the cam arm 42. The position of the roller 46 is such that, with the piston 30 at a desired neutral position intermediate the cylinder ends 28, 29, the cam arm 42 is held in a neutral position in which its axis is approximately perpendicular to that of the piston rod 21. The cables 41 are rigged so that, with the cam arm 42 in its neutral position, the valve arms, 37, 39 are so positioned as to hold each valve 35, 36, in a corresponding neutral position between its respective two extreme positions. Upward and downward motion of the piston rod 21 of course causes the roller 46 to impart motion to the cam 42, as will be described.

In FIGURE 3, the piston rod 21 of FIGURE 2 has moved up from neutral, and the roller 46 has pivoted the cam arm 42 in a clockwise direction until continued upward travel of the roller has caused it to begin to leave the notch in the end 47 of the cam arm. The cam arm 42 is held in its clockwise position 49 by a tension spring 48 connected to the cam arm 42 near its notched end 47 and further attached to the cam arm mounting bracket 44, both attachments of the spring 48 being on the centerline of the cam arm 42 when the latter is in its neutral position and the spring 48 having been omitted from FIGURE 2 to clarify the showing of the cam arm. When the piston rod makes a down stroke, the roller 46 again engages the notched end 47 of the cam arm 42 and moves the latter to its neutral position 50, thus simultaneously stretching the spring 48 and moving the valves 35, 36 to their neutral position 53. As the roller 46 moves below its neutral position, the cam arm 42 is rotated counterclockwise and the spring 48 contracts to urge the cam arm 42 toward its counterclockwise position 51, in which position the cam arm remains upon continued downward motion of the roller. The next upward motion of the roller 46 will of course move the cam arm 42 upwardly. Appropriate stop means (not shown) are provided internally or externally of the valves 35, 36 to prevent their rotation beyond their clockwise and counterclockwise positions 52, 54. It is conceivable that some extraneous force might place the cam arm 42 in, for example, its clockwise position 49 before having been moved to the same by the roller 46, whereupon the upwardly moving roller will strike the cam arm on its side rather than in its notched end 47. In such event, no harm is done, for an affected one of the overload relief springs 40 yields to allow rotation of the cam 42 until the roller 46 has passed and to return the cam to its proper, deflected position wherein it is normally engaged by the roller 46 upon the next stroke of the latter. It is evident that the cam 42, roller 46 and cables 41 are a means for placing the first, pressure control valve 35 in its first position 54 during periods when the piston 30 lies between the cylinder closed end 29 (see also FIGURE 2) and the neutral, mean position 55 of the piston 30 and in its second position 52 when the piston moves above its mean, neutral position toward the other end 28 of the cylinder.

The pressure control and pilot valves 35, 36 have hydraulic connections shown as cut away in FIGURES 2 and 3 and schematically shown, in their relations to the remainder of the device, in FIGURE 4. In the latter figure, the dotted line 56 represents the linkage (roller 46, cam arm 42, and cables 41) attaching the piston rod 21 to the pressure control valve 35, and the latter is attached to the pilot valve 36 by the previously described linkage represented by the dotted line 57. A closed tank 58, of volume preferably of the order of 17 times that of the cylinder 18 in a representative embodiment, is provided with communication with the cylinder closed end 29 by a first conduit 59 which includes, preferably in form of a variable flow restrictor 60 interposed in the conduit, means for damping oscillation of the piston 30 to each side of the neutral, mean position 55 which lies intermediate the cylinder ends 28, 29 and which position may, for example, be located at the center of the cylinder 18.

A second conduit 61 is connected into the first conduit 59 on each side of the restrictor 60 and in bypassing relation to the latter. This second conduit 61 contains means for restricting fluid flow therethrough which will be explained in later paragraphs.

A source of compressed air comprises a pump 62 and accumulator 63 connected into the tank 58 by means including an air supply conduit with segments 64, 65, 66, and 67. Interposed in the air supply conduit is the first or pressure control valve 35. This valve 35 is shown as positioned by the linkage 56 between its two positions, in the first of which positions it connects the tank into the air supply through conduit segments 64, 65, 66, 67, 61, and 59 and in the second of which positions it connects the tank into the atmosphere through conduits 59, 61, 67, 66, 68 and a muffler 69, which is connected to the exhaust port of the valve 35 through conduit 63. It will become evident that the first valve 35 and associated conduits, together with the air supply 62, 63 and linkage 56, constitute means for regulating air pressure in the tank 58 to a pressure neutralizing the average force imposed by the load 11 (FIGURE 1) on the piston rod 21 and maintaining the piston 30 (FIGURE 4) in its neutral, mean position 55.

The means for restricting flow through the second conduit 61 preferably comprises a second valve 70 such as the piloted check valve sold under the part number WD4–185–X1 by the Womack Machine Supply Company of Dallas, Texas. This damping check valve 70, interposed in the second conduit 61, restricts flow through the second conduit 61 during periods when the piston 30 is moving away from its mean, neutral position 55 and allows substantially free flow through the second conduit when the piston is moving toward its mean, neutral position. The valve 70 thus has a first position in which it restricts flow and a second position in which it allows free flow through the second conduit 61.

The means placing the damping check valve 70 in its first position during periods when the piston 30 is moving away from its mean, neutral position 55 and in its second position when the piston is moving in the opposite direction includes the pilot valve 36 and the linkage 57 which positions the latter. The pilot valve 36, in its first position, connects the pilot chamber 71 of the check valve 70, through line 72, into the first conduit 59 between the restrictor 60 and the cylinder closed end 29 and is placed in this position by the linkages 56, 57 during periods when the piston 30 is below its neutral position 55. During periods when the piston 30 is above its neutral position 55, the linkages 56, 57 place the pilot valve 36 in its second position wherein it connects the check valve pilot chamber 71, through line 76, with the first conduit 59 between the restrictor 60 and the tank 58.

A first, adjustably variable restrictor 73 is interposed in the air supply conduit segment 65 between the pressure control valve 35 and the air supply 62, 63; a similar restrictor 74 is interposed in the exhaust line 68 between the pressure control valve 35 and muffler 69.

To maintain the pressure of air supplied to the pressure control valve 35 in constant ratio to the air pressure in the tank 58, a regulator 75 is interposed in the air supply conduit segment 65 between the first restrictor 73 and air supply 62, 63. A representative embodiment of the regulator 75 is in the device marketed under the part number 2348312 by Talco, Inc., Santa Monica, California. Provided with air supply pressure through conduit segment 65 and with the pressure of the tank through line 76, the regulator 75 maintains air supply pressure, at the pressure control valve 35, at a chosen percentage (for example, 120%) of tank pressure.

As will be described, the pressure control valve 35 provides for automatic centering of the piston 30 on the desired mean, neutral position 55. Under some operating conditions, however, it is desired to have manual control of the average position of the piston 30 through regulation of air pressure in the tank 58. To this end, there is provided a conduit 77 connected into the air supply conduit segments 65, 66 in bypassing relation (i.e., on each side of) the pressure control valve 35. In this conduit 77 there is interposed a manually controllable valve 78 having a first position preventing flow through the conduit 77, a second position allowing flow through the conduit 77 from the air source 62, 63 to the tank 58, and a third position allowing flow from the tank 58 into the exhaust conduit 68 leading to the atmosphere.

The first shut-off valve 80 is introduced into the air supply conduit segment 66 between the pressure control valve 35 and tank 58; still more specifically, the shut-off valve 80 is located between the pressure control valve 35 and the point of connection of the conduit 67 into the air supply conduit segment 66. The second shut-off valve 79 is connected into the first conduit 59 between the second conduit 61 and the tank 58. Respective linkages 81, 82 connect the manually operable second shut-off valve 79 with the first shut-off valve 80 and the damping means variable restrictor 60, and the nature of these linkages in such that closure of the second shut-off valve 79 effects closure of the first shut-off valve 80 and the damping valve 60.

Other items which may be included in the device are pressure gages 83, 84, 85 connected respectively into the cylinder closed end 29, the tank 58, and the air supply conduit segment 64 upstream of the pressure ratio regulator 75.

When the load 11 is placed in the water as in FIGURE 1, the air pressure in the tank 58 (FIGURE 4) may not exactly counterbalance the average force imposed on the piston rod 21 by the load; while the device will yield in the manner of a very soft spring as the ship pitches and rolls relative to the load, the average position of the piston 30 may not occupy the desired position 55 intermediate the ends of the cylinder 18 but may lie above or below that position. With the shut-off valves 79, 80 open and the manual control valve 78 in its first, closed position, the piston rod linkage 56 positions the first, pressure control valve 35 in its first position during periods when the piston 30 is below the chosen neutral position 55 (in the example, the center of the cylinder 18) and admits more air into the tank 58, thus increasing the pneumatic force urging the piston toward an average position located at the cylinder center 55. If the piston 30, to begin with, never rises above the cylinder center 55, airflow from the air source 62, 63 to the tank 58 is continuous until the piston begins to oscillate through a range carrying it above the cylinder center. If, on the other hand, the piston 30 should initially oscillate through a range lying wholly above the cylinder center 55, the piston rod linkage 56 will hold the first valve 35 in its second position wherein the tank pressure is bled into the atmosphere through exhaust conduit 68, and this bleeding will be continuous until the release of pressure has allowed the piston to drop to a range of oscillation carrying it below the desired neutral, mean position 55 at the center of the cylinder 18. In the usual mode of operation, the piston 30 will from the start oscillate through a range which carries it both above and below the desired mean, neutral position 55. Since the cam 42 (FIGURE 3) is a two-position device and occupies a neutral position only in the brief instant of the piston 30 passing through the desired neutral position 55, the pressure control valve 35 is at virtually all times in either its first position 54 or second position 52; consequently, air is virtually continually being either injected into or bled from the tank 58 (FIGURE 4). If the rate of injection of air, in a given interval, is the equivalent of the rate of bleeding of air in a like interval, it follows that more air will be injected than exhausted if the piston 30 spends more than half the time below the desired mean, neutral position 55, and the net effect of the repeated bleedings and injections will be to raise the average position of the piston toward (and eventually to) the desired, mean position 55. In the case, however, where the piston 30 spends more time above the desired, mean position 55, more air is exhausted than injected, and the piston average position sinks. When the piston 30 has come to spend as much time on one side of the desired position 55 as the other, the amount of air injected equals that exhausted and the piston average position remains in coincidence with the desired, mean neutral position 55.

To ensure that air always will flow into the tank 58 upon the pressure control valve 35 being placed in its first position, the air supplied to the valve 35 must always be at higher pressure than the air in the tank 58. To obtain a desired pressure rise in the tank 58 in terms of percent of pressure increase per given time interval, the supply pressure must be at constant ratio to the tank pressure. This is accomplished, as previously explained, by the constant pressure ratio regulator 75. The rate at which air is admitted into the tank 58 upon the first valve 35 being placed in its first position is regulated to a desired value by adjusting the first variable restrictor 73. The second variable restrictor 74 then is adjusted until the rate of exhaust of air when the valve 35 is in its second position is equal to the rate of injection when the valve 35 is oppositely positioned. Because of the restrictors 73, 74, the rate of change of average position of the piston 30 is relatively slow, and a significant change occurs over a number of cycles rather than during a single oscillation of the piston; consequently, the changes in cable tension attributable to the injection of air into or bleeding of air from the tank 58 are relatively very small.

Since the device and the load 11, in combination, have a low natural frequency of oscillation, preferably 0.04 cycle per second in a representation example, the piston 30 tends to oscillate upwardly and downwardly past the desired neutral position 55 even when this is coincident with the piston's average position. The damping means 60, 70 greatly diminish the amplitude of such oscillations, thus making the device useful in much higher seas than it would be without damping. The damping restrictor 60 is closed to a degree yielding a desired amount of damping through introducing resistance into the flow between the cylinder closed end 29 and tank 58. Again because of the low natural frequency of oscillation of the device, maximum reduction of oscillation will not occur if the flow between the tank 58 and cylinder end 29 is equally restricted in both directions and at all times. Selective restriction which occurs only when the piston 30 is moving away from the desired neutral position 55 is provided by the piloted check valve 70. As the piston 30 moves downwardly and passes the center 55 of the cylinder, the linkages 56, 57 place the pilot valve 36 in its first position wherein the pilot chamber 71 of the check valve 36 is connected, through the pilot valve 36 and line 72, into the first conduit 59 between the cylinder end 29 and restrictor 60. Because of the restrictor 60, the pressure in the line 72 is higher than in the tank 58, and the check valve 70 closes to provide resistance to movement of the piston 30 away from the desired neutral position 55. A resilient means, typified by a spring 86, is instrumental in moving the valve 70 to its closed position. In some applications, the needed, resiliently applied force is supplied by gravity. When the piston 30 starts to move upwardly, pressure in the line 72 becomes the lower, and the check valve 70 opens, thus allowing unrestricted flow into the cylinder end 29 through the second conduit 61. Upon the piston 30 passing the cylinder center 55, it is desirable to offer an increased degree of resistance to further upward motion of the piston, and the linkages 56, 57 place the pilot valve 70 in its second position wherein the check valve pilot chamber 71 is connected through line 76 into the first conduit 59 between the restrictor 60 and tank 58. Because of the restrictor 60, the pressure in line 73 is higher than in the cylinder end 29 and at least as high as in the second conduit 61; therefore, expansion of the resilient means 86 is accompanied by closure of the check valve 70. Upon the piston 30 reaching the end of its upward stroke and starting to move downwardly again, pressure becomes lower in the line 76, and hence in the pilot chamber 71 of the check valve 70, than in the cylinder closed end 29. While the pressure on the seated end-face of the movable element of valve 70 is substantially the same as in the pilot chamber 71, the higher pressure of the cylinder closed end 29 is applied to an annular shoulder 87 intermediate the ends of the valve movable element and thus creates an overbalancing force which opens the check valve 70 against resistance of the resilient means 86, thus removing flow resistance which would impede motion of the piston 30 toward the cylinder center 55.

It will be understood that the invention is not limited to use of the specific damping check valve arrangement named and that other arrangements providing the sequence of operations described may be employed. It further will be understood that whereas, in the example, the desired neutral, mean position 55 of the piston 30 is described as located at the center of the cylinder 18, the desired position may be displaced from the cylinder center and is only limited to a location somewhere intermediate the cylinder ends 28, 29. The stated limitation is an important one, however; location of the neutral position 55 at the bottom end 29 of the cylinder 18 would eliminate all resiliency of response of the device to a pull on the cable 10 by the load 11, while location of the neutral position 55 at the cylinder top end 28 would reduce operation of the device to that of a mere over-tension relief spring.

As described above, an imbalance of the cable load with the tank pressure is eventually corrected by operation of the pressure control valve 35. Where the imbalance is large, however, it is readily possible to correct it quickly by use of the manually controllable balance valve 78. This valve 78 is placed, as appropriate, in either its second or third position to inject air into or bleed air from the tank 58 until balance is achieved, whereupon airflow is halted by placing the valve 78 in its first or "off" position.

The balancing procedures and operations described above are applicable where the load 11 is balanced in air as well as in water.

In some cases, it will be desired to place a load 11 on the bottom of the seat but to avoid cable slack by maintaining a predetermined tension in the cable 10. This is effected by winching the balanced load 11 to the bottom, then closing the first shut-off valve 80 to eliminate the effect of operation of the pressure control valve 35. The manually controlled balance valve 78 then is placed in its third position to bleed off air from the tank 58 until the latter contains, for example, only 70% to 80% of the pressure needed for balancing the load 11.

In winching the load 11 off the deck or above the water, it often is desirable to provide a quite hard spring until the load is set down or until balancing in air or water is desired. This is effected by entirely closing the damper restrictor valve 60, thus shutting off communication between the tank 58 and cylinder closed end 29. The amount of air in the cylinder 18 is small compared to that in the tank 58 and therefore functions to provide a relatively hard spring action.

While very efficient in operation as a very soft spring whose force is automatically adjusted to achieve delicate balance with a load, the device can also be regulated to serve, in towing and other operations, as a hard, overtension relief spring. Whereas an embodiment of the device, employed aboard ship, has reduced variation of cable tension to ±3.3% even in eight-foot waves when employed as a soft spring, as high a yielding force as desired may be obtained by shifting to operation as a hard spring. For towing, etc., this is accomplished by closing the first shut-off valve 80 and placing the manually controlled balance valve 78 in its second position to admit air into the tank 58 until the desired stiffness of spring (for example, 50% of the breaking load of a tow cable) is obtained. The manually controlled valve 78 then is returned to its "off" (first) position. To prevent bottoming of the piston 30 in the cylinder upon application of an excessively heavy load, the damping restrictor valve 60 preferably is partially closed.

Since the device requires no electronic or other means for sensing the tension in the cable, a heavy-duty motor for fast acceleration or reversal of the winch, etc., it is light and inexpensive in construction and very economical to operate. Only the piston 30, rod 21, and sheaves 13, 14 are moved, and the inertia of the device accordingly is very low. For this reason, very little power is needed for its operation, and a representative embodiment with a 30-foot cable stroke requires only a three horsepower air compressor motor as its sole power supply. Because of its simplicity and the ruggedness which may be built into its parts, the device is highly reliable and requires but little maintenance. Repairs, when needed, are simple and inexpensive.

While only one embodiment of the invention has been described in detail herein and shown in the accompanying drawing, it will be evident that various modifications are possible in the arrangement and construction of its components without departing from the scope of the invention.

I claim:
1. A cable tension control device comprising:
   a pneumatic actuator having a barrel with a first, closed end and a second end, a piston slidably mounted in the barrel, and a piston rod extending through the barrel second end;
   means attaching the rod to a varying load which tends to cause the piston to oscillate to each side of a desired neutral, mean position intermediate the ends of the cylinder and which imposes on the piston an average force which tends to urge the piston away from the desired neutral, mean position;
   a closed tank having communication with the interior of the closed end of the cylinder;

and means regulating average air pressure in the tank to a pressure exactly neutralizing the average force imposed by the load and maintaining the piston in said neutral, mean position the last-named means comprising:

a source of compressed air;

a valve interposed between the air source and tank and having a first position in which it connects the tank with the air source and a second position in which it connects the tank with the atmosphere;

and means placing the valve in its first position immediately upon the piston passing beyond said desired neutral, mean position toward the barrel closed end and placing the valve in its second position immediately upon the piston passing beyond said desired neutral, mean position toward the barrel other end, said means comprising a linkage connected between the piston rod and the valve.

2. A cable tension control device comprising:

a pneumatic actuator having a barrel with a first, closed end and a second end, a piston slidably mounted in the barrel, and a piston rod extending through the barrel second end, the piston having a desired neutral, mean position intermediate the barrel ends and being movable in both directions, along the barrel axis, from the desired neutral, mean position;

means attaching the rod to a varying load which imposes an average force urging the piston away from the desired neutral, mean position intermediate the ends of the barrel;

a closed tank;

a first conduit providing communication between the interiors of the tank and the closed end of the barrel;

a flow restrictor interposed in said first conduit;

a second conduit connected into the first conduit on each side of the restrictor in bypassing relation to the latter;

means restricting flow through the second conduit during periods when the piston is moving toward the barrel first, closed end and away from said neutral, mean position and when the piston is moving toward the barrel second end and away from said neutral, mean position, said means less restricting flow through the second conduit during periods when the piston is moving toward said neutral, mean position;

and means regulating air pressure in the tank to a pressure neutralizing the average force imposed by the load and maintaining the piston in said neutral, mean position.

3. A cable tension control device comprising:

a pneumatic actuator having a barrel with a first, closed end and a second end, a piston slidably mounted in the barrel, and a piston rod extending through the barrel second end;

means attaching the rod to a varying load which imposes an average force urging the piston away from a neutral, mean position intermediate the ends of the barrel;

a closed tank;

a first conduit providing communication between the interiors of the tank and the closed end of the barrel;

a flow restrictor interposed in said first conduit;

a second conduit connected into the first conduit on each side of the restrictor in bypassing relation to the latter;

a valve interposed in the second conduit and having a first position in which it restricts flow and a second position in which it allows substantially free flow through the second conduit;

means placing said valve in its first position during periods when the piston is moving toward the barrel first, closed end and away from said neutral, mean position and when the piston is moving toward the barrel second end and away from said neutral, mean position, said means placing said valve in its second position during periods when the piston is moving toward said mean, neutral position;

and means regulating air pressure in the tank to a pressure neutralizing the average force imposed by the load and maintaining the piston in said neutral, mean position.

4. A cable tension control device comprising:

a pneumatic actuator having a barrel with a first, closed end and a second end, a piston slidably mounted in the barrel, and a piston rod extending through the barrel second end;

means attaching the rod to a varying load which imposes an average force urging the piston away from a neutral, mean position intermediate the ends of the cylinder;

a closed tank;

a first conduit providing communication between the interiors of the tank and the closed end of the cylinder;

a source of compressed air;

means connecting the source of compressed air into the tank;

a first valve interposed in said means connecting the source of compressed air into the tank and having a first position in which it connects the tank to the air source and a second position in which it connects the tank into the atmosphere, the first valve having an exhaust port;

means placing the first valve in its first position during periods when the piston lies between the barrel closed end and said neutral, mean position and in its second position during periods when the piston lies between the barrel other end and said neutral, mean position, said means comprising a linkage connected between the piston rod and valve;

a flow restrictor interposed in said first conduit;

a second conduit connected into the first conduit on each side of and in bypassing relation to the restrictor;

a second valve interposed in the second conduit and having a first position in which it restricts flow and a second position in which it allows substantially free flow through the second conduit;

and means placing the second valve in its first position during periods in which the piston is moving away from said mean, neutral position and in its second position during periods in which the piston is moving toward said mean, neutral position, said last-named means comprising a linkage between the piston rod and second valve.

5. A cable tension control device comprising:

a pneumatic actuator having a barrel with a first, closed end and a second end, a piston slidably mounted in the barrel, and a piston rod extending through the barrel second end;

means attaching the rod to a varying load which imposes an average force urging the piston away from a neutral, mean position intermediate the ends of the barrel;

a closed tank having communication with the interior of the closed end of the barrel;

a source of compressed air;

means connecting the source of compressed air into the tank;

means for regulating air pressure in the tank to a pressure neutralizing the average force imposed by the load and maintaining the piston in said neutral, mean position, the last-named means including a pressure control valve of given flow capacity and interposed in the means connecting the source of compressed air into the tank, said pressure control valve having a first position in which it connects the tank to the compressed air source and a second position in which it connects the tank into the atmosphere;

mean placing the pressure control valve in its first position during periods when the piston lies between the barrel closed end and said neutral, mean position and in its second position during periods when the piston lies between the barrel other end and said neutral, mean position, said means comprising a linkage connected between the piston rod and valve;

a manual control bypass conduit connected into the means connecting the source of compressed air into the tank at respective points on each side of the pressure control valve and in bypassing relation to the latter;

and a manually controllable, second valve of greater flow capacity than the flow capacity of the pressure control valve and interposed in said conduit and having a first position in which it prevents flow through said conduit, a second position in which it allows flow through said conduit from the air source into the tank, and a third position in which it allows flow through said conduit from the tank into the atmosphere.

6. The device claimed in claim 5 and further comprising a shut-off valve interposed in said means connecting the source of compressed air into the tank at a location lying between the pressure control valve and the tank and between the pressure control valve and one of said points of connection of the manual control bypass conduit into the means connecting the source of compressed air into the tank.

7. The device claimed in claim 5,
said device including a conduit providing said communication of the tank with the closed end of the cylinder,
and said device further including means for damping oscillation of the piston to each side of said neutral, mean position, said means including a flow restrictor interposed in the last-named one of said conduits.

8. A cable tension control device comprising:
a pneumatic actuator having a barrel with a first, closed end and a second end, a piston slidably mounted in the barrel, and a piston rod extending through the barrel second end;

means attaching the rod to a varying load which imposes an average force urging the piston away from a neutral, mean position intermediate the ends of the cylinder;

a closed tank;

a conduit connecting the tank into the cylinder closed end;

a source of compressed air;

an air supply conduit connecting the air source into the tank;

a pressure control valve interposed in the air supply conduit and variable between a first position in which it permits airflow through the air supply conduit from the air supply into the tank and a second position in which it permits airflow through the air supply conduit from the tank into the atmosphere, said valve having an exhaust port;

means placing the pressure control valve in its first position immediately upon the piston passing beyond said neutral, means position toward the barrel closed end and in its second position immediately upon the piston passing beyond said neutral mean position toward the barrel other end, said means comprising a linkage connected between the piston rod and the valve;

a first variable restrictor interposed in the air supply conduit between the air supply and the pressure control valve;

and a second variable restrictor interposed in the air supply conduit between the pressure control valve and the atmosphere.

9. The device claimed in claim 8 and further including means interposed in the air supply conduit between the air supply and first variable restrictor and maintaining the pressure of air supplied to the valve through the air supply conduit in constant ratio to the pressure of air in the tank.

10. A cable tension control device comprising:
a pneumatic actuator having a barrel with a first, closed end and a second end, a piston slidably mounted in the barrel, and a piston rod extending through the barrel second end;

means attaching the rod to a varying load which imposes an average force urging the piston away from a neutral, mean position intermediate the ends of the cylinder;

a closed tank;

a first conduit connecting the tank into the cylinder closed end;

a source of compressed air;

an air supply conduit connecting the air source into the tank;

a pressure control valve interposed in the air supply conduit and variable between a first position in which it permits airflow through the air supply conduit from the air supply into the tank and a second position in which it permits airflow through the air supply conduit from the tank into the atmosphere, said valve having an exhaust port;

means placing the pressure control valve in its first position during periods when the piston lies between the barrel closed end and said neutral, mean position and in its second position during periods in which the piston lies between the barrel other end and said neutral, mean position, said means comprising a linkage connected between the piston rod and the pressure control valve;

a first variable restrictor interposed in the air supply conduit between the air supply and the pressure control valve;

a second variable restrictor interposed in the air supply conduit between the pressure control valve and the atmosphere;

a flow restrictor interposed in said first conduit;

a second conduit connected into the first conduit on each side of and in bypassing relation to the restrictor;

a second valve interposed in the second conduit and having a first position in which it restricts flow and a second position in which it allows substantially free flow through the second conduit;

and means placing the second valve in its first position during periods in which the piston is moving away from said mean, neutral position and in its second position during periods in which the piston is moving toward said mean, neutral position, said last-named means comprising a linkage between the piston rod and second valve.

11. The device claimed in claim 10 and further comprising:
a manual control bypass conduit connected into the means connecting the source of compressed air into the tank at respective points on each side of and in bypassing relation to the pressure control valve;

and a manually controllable valve interposed in said conduit and having a first position in which it prevents flow through the manual control bypass conduit, a second position in which it allows flow through the manual control bypass conduit from the air source into the tank, and a third position in which it allows flow through the manual control bypass conduit from the tank into the atmosphere.

12. The device claimed in claim 11 and further including:
- a first shut-off valve interposed in the air supply conduit at a location between the pressure control valve and the tank and between the pressure control valve and a one of said points of connection of the manual control bypass conduit into the air supply conduit;
- and a second shut-off valve connected into the first conduit between the second conduit and the tank.

References Cited in the file of this patent
UNITED STATES PATENTS

| | | |
|---|---|---|
| 467,529 | Victor | Jan. 26, 1892 |
| 619,073 | Deering | Feb. 7, 1899 |
| 619,074 | Deering | Feb. 7, 1899 |
| 2,588,037 | Orton | Mar. 4, 1952 |
| 2,732,180 | Gratzmuller | Jan. 24, 1956 |